United States Patent
Frankiewicz et al.

(10) Patent No.: US 7,190,863 B2
(45) Date of Patent: Mar. 13, 2007

(54) LIGHT-PIPE ARRANGEMENT WITH REDUCED FRESNEL-REFLECTION LOSSES

(75) Inventors: Gregory P. Frankiewicz, Mayfield Heights, OH (US); Roger F. Buelow, II, Gates Mills, OH (US); Chris H. Jenson, Twinsburg, OH (US); John M. Davenport, Middleburg Heights, OH (US); Dave Bina, Northfield Center, OH (US)

(73) Assignee: Fiberstars, Inc., Solon, OH (US)

( * ) Notice: Subject to any disclaimer, the term of this patent is extended or adjusted under 35 U.S.C. 154(b) by 89 days.

(21) Appl. No.: 10/797,859

(22) Filed: Mar. 10, 2004

(65) Prior Publication Data

US 2004/0218864 A1 Nov. 4, 2004

Related U.S. Application Data

(60) Provisional application No. 60/453,371, filed on Mar. 10, 2003.

(51) Int. Cl.
*G02B 6/26* (2006.01)
*G02B 6/30* (2006.01)
*G02B 6/42* (2006.01)
*G02B 6/38* (2006.01)

(52) U.S. Cl. .......................... 385/49; 385/50; 385/58; 385/70; 385/51

(58) Field of Classification Search ............... 385/51, 385/58, 70, 93
See application file for complete search history.

(56) References Cited

U.S. PATENT DOCUMENTS

| 4,456,329 | A | * | 6/1984 | Henderson et al. | 385/44 |
| 4,535,026 | A | * | 8/1985 | Yoldas et al. | 428/310.5 |
| 4,836,633 | A | * | 6/1989 | Morgan et al. | 385/34 |
| 6,236,793 | B1 | * | 5/2001 | Lawrence et al. | 385/132 |
| 6,969,897 | B2 | * | 11/2005 | Kim, II | 257/432 |
| 2002/0097956 | A1 | * | 7/2002 | Kikuchi et al. | 385/33 |
| 2002/0168145 | A1 | * | 11/2002 | Yin | 385/49 |

* cited by examiner

*Primary Examiner*—Brian Healy
*Assistant Examiner*—Charlie Peng
(74) *Attorney, Agent, or Firm*—Charles E. Bruzga; Bruzga & Associates

(57) ABSTRACT

A solid light pipe arrangement with reduced Fresnel-reflection losses includes a light pipe with a solid core comprising a polymer. An optically clear substrate has first and second sides with an anti-reflective coating on at least one side. The substrate is adhered to an end-face of the core of the light pipe by adhesive material so as to create an optically clear interface between the substrate and the end-face that passes more than about 96 percent of transmitted light. A preferred method of applying an anti-reflective coating to an end-face of a core of a solid, polymeric light pipe comprises diverting uncrosslinked polymer used for forming a light pipe core, and using the diverted polymer as adhesive material between a substrate with at least one antireflective coating and the end-face of a light pipe having the same polymeric components, in the same proportions, as the diverted polymer.

35 Claims, 2 Drawing Sheets

LIGHT-PIPE ARRANGEMENT WITH REDUCED FRESNEL-REFLECTION LOSSES

This application claims priority from U.S. Provisional Patent Application No. 60/453,371 filed Mar. 10, 2003

FIELD OF THE INVENTION

The invention relates to a way of increasing throughput of light transmitted through solid light pipes. More particularly, the invention relates to providing an antireflective material on one or both end-faces of a light pipe for reducing light losses due to Fresnel reflections at those end-faces.

BACKGROUND OF THE INVENTION

The typical losses in light throughput associated with a length of solid light pipe include the following five factors: (1) absorption in the light-transport material, (2) light scattering due to impurities present in the light-transport material, (3) light scattering at the core-cladding interface, (4) light lost due to bends in the light pipe, and (5) light lost at the input and output ends of the light pipe due to Fresnel reflections. The first three factors (1)–(3) are associated with the light-pipe materials: how such materials interact with the other components of the light pipe, and how the light pipe is bent for routing purposes. These losses can be expressed as an "attenuation number," which is a percentage of lost light per foot of light pipe, with such losses increasing as the length of the light pipe increases. The losses associated with how the light pipe is bent are dependent on the light pipe diameter, the radius of the bend, and the angle of light that the light pipe can transmit without a loss in light.

The losses due to Fresnel reflections are independent of the material of the light pipe and are constant irrespective of the length of the light pipe. The losses associated with Fresnel reflections are on the order of 4% per surface. A typical method for regaining this light lost on surfaces with a large area, such as desktop computer monitor screens, is to apply an anti-reflective (AR) thin film onto the surface. Typically, this preserves 2–3% of the light at each surface that would be otherwise lost to Fresnel reflections.

Most commercial AR coaters apply an AR coating to a large thin sheet, or to a thin film roll as it is rolled through the coater and re-rolled at the output. Such AR coaters are not designed to handle the much different geometry of the end-faces of light-transmitting cores of light pipes, which may typically be from 3 mm to 25 mm in diameter, and whose length typically varies from a few up to 30 meters. In short, commercially available coaters are designed to coat large-area sheets or films, not the end-faces of long light pipes.

Another problem with the commercial AR-coaters for coating thin films is that the operating temperature of these systems is generally around 100 degrees C. The polymer core of the light pipe at this temperature will survive; however, the polymer becomes soft and swells, so that the core face is no longer flat, but bulges in a rounded fashion. This bulging of the polymer fiber core would result in the AR coating cracking and flaking off when the core cools and becomes flat again. Other commercial AR coaters capable of coating the end-face of a light pipe—such as those used in e-beam evaporation machines used to coat the end-faces of glass rods up to 25 mm in diameter—apply coatings at an elevated temperature such as more than 250 degrees Centigrade. Such temperatures would damage plastic light pipes comprising a polymer, so the technique would not be successful even if AR-coating machines were modified to accommodate the much different geometries of light pipes.

Additionally, for any AR coating, or AR-coated substrate, for a solid light pipe, the following features, among others, would be desired: (1) resistance to heat and light encountered in normal use of light pipes, (2) high optical clarity, and (3) resistance to cracking in normal use of the light pipe.

It would be desirable to provide an arrangement for supplying a suitable AR coating at one or both end-faces of a solid, polymer-based light pipe. This would reduce Fresnel-reflection losses, increasing light throughput in the light pipes.

SUMMARY OF THE INVENTION

One embodiment of the invention provides a solid light pipe arrangement with reduced Fresnel-reflection losses. The arrangement includes a light pipe with a solid core comprising a polymer. An optically clear substrate has first and second sides with an anti-reflective coating on at least one side. The substrate is adhered to an end-face of the core of the light pipe by adhesive material so as to create an optically clear interface between the substrate and the end-face that passes more than about 96 percent of transmitted light. This embodiment reduces Fresnel-reflection losses associated with the light pipe.

A preferred method of applying an anti-reflective coating to an end-face of a core of a solid, polymeric light pipe comprises diverting uncrosslinked polymer used for forming a light pipe core, which polymer is fully polymerized and contains the necessary ingredients to form a light pipe core. The uncrosslinked polymer is applied as adhesive material between a substrate coated with at least one anti-reflective coating and an end-face of a core of a solid, polymeric light pipe having the same polymeric components, in the same proportions, as the diverted polymer.

The adhesive material so obtained provides a durable, optically clear interface between substrate and end-face of a light pipe core.

BRIEF DESCRIPTION OF THE DRAWINGS

FIG. 2b shows an assembled view of the parts of FIG. 2a.

DETAILED DESCRIPTION OF THE INVENTION

This description describes the three topics of (1) general considerations, (2) adhesive-material considerations, and (3) substrate considerations.

1. General Considerations

Figure 1:
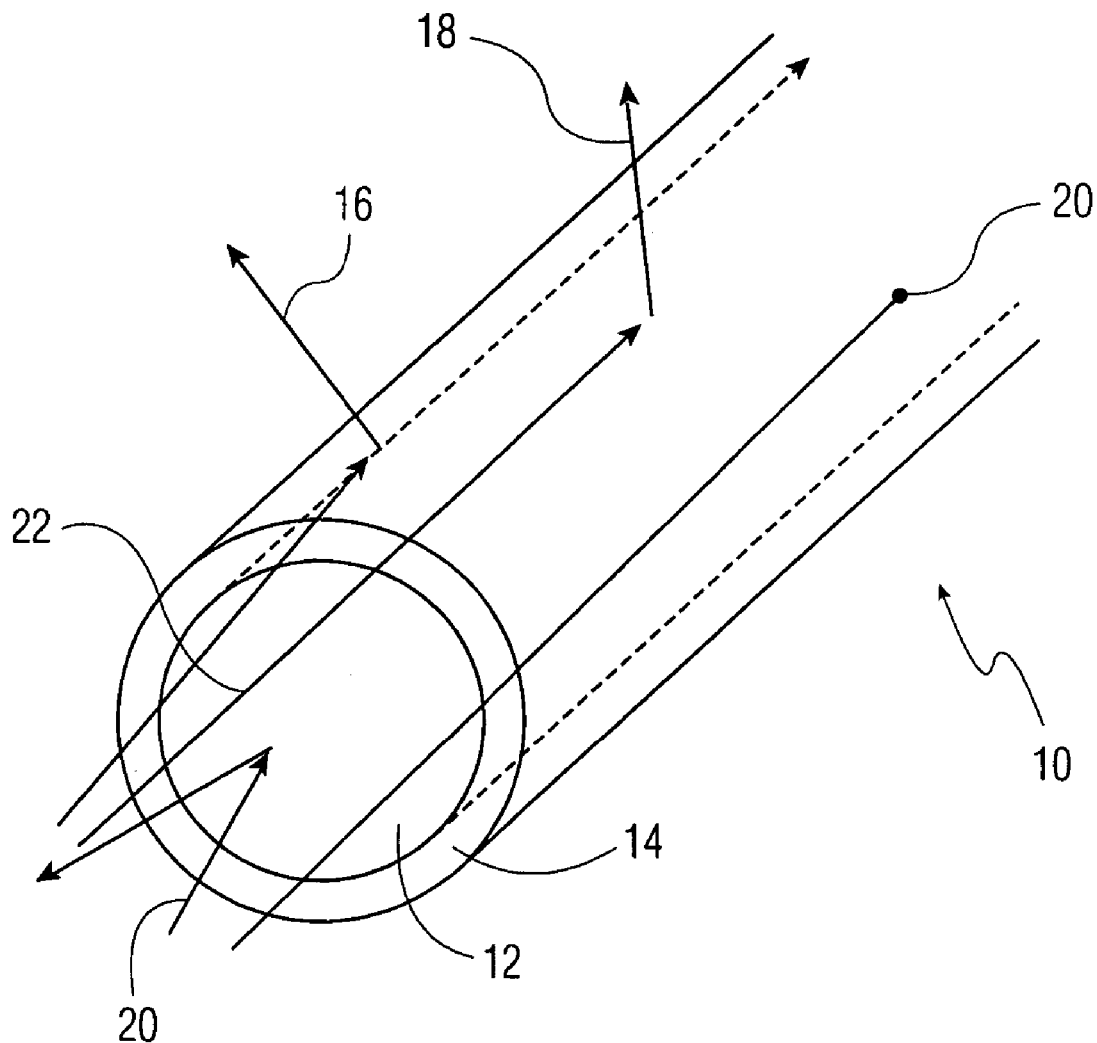
FIG. 1 is a perspective view of common components of a light pipe and common loss mechanisms.

FIG. 1 illustrates typical light-loss mechanisms for a light pipe 10 having a solid core 12, comprising polymer, and a cladding 14 comprising a fluoropolymer with a refractive index lower than that of the core. A light ray 16 shows light scattering from the side of the light pipe due to imperfections at the core-clad interface. A light ray 18 shows light scattering from core 12 due to an impurity in the core. A light ray 20 shows absorption of light in core 12. Finally, a light ray 20 shows light loss due to a Fresnel reflection at end-face 22 of the core. The present invention relates to reducing light loss due to such Fresnel reflections on an end-face of the core, or light-transporting portion, of the light pipe.

The present invention more particularly concerns how to fashion a suitable AR coating at light pipe end-faces that exhibit one or more of the properties of: (1) resistance to heat and light encountered in normal use of light pipes, (2) high optical clarity, (3) resistance to cracking in normal use of the light pipe.

Figure 2A:
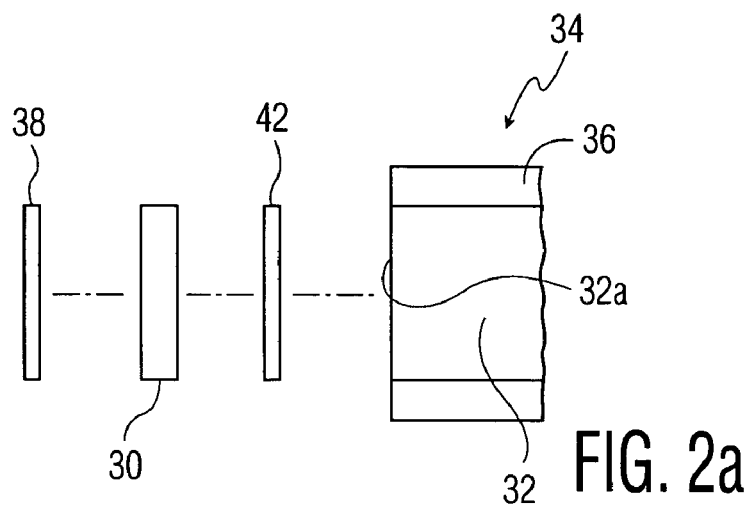
FIG. 2a is an exploded side view of an AR-coated substrate, an adhesive layer, and the end of a light pipe.
Figure 2B:
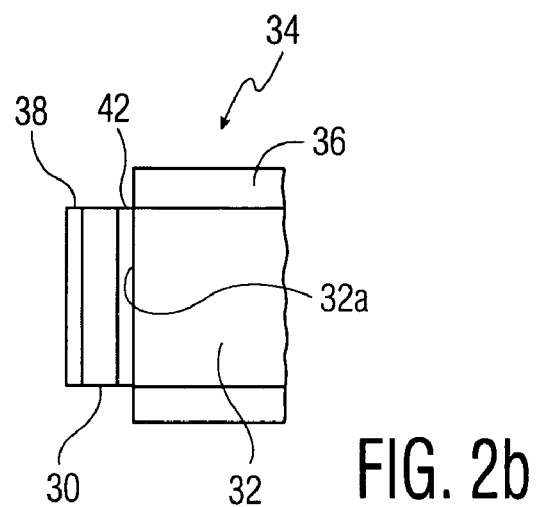
Figure 3:
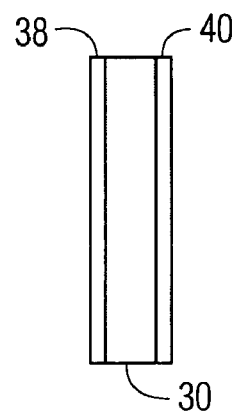
FIG. 3 is a side view of a substrate with AR coatings on both of its sides.

As shown in FIGS. 2a and 2b, a substrate 30, according to the invention, preferably of high optical clarity, is attached to a core 32 of a light pipe 34 having a cladding 36. By "high optical clarity" (or "optically lear") of the substrate is meant that the substrate passes at least about 96 percent of transmitted light, and more preferably more than about 99 percent of transmitted light. Substrate 30 has an AR coating 38 on at least one of its two sides, as shown, but, as shown in FIG. 3, also could have another AR coating 40 on its other side so that any section of the substrate that does not adhere well to the light pipe will still have good light transmission. Light pipe core 32 comprises a solid polymer, and cladding 36 comprises a fluoropolymer with a lower index of refraction than the core. An adhesive material 42 joins substrate 30 to an end-face 32a of core 32.

Substrate 30 is typically cut to size from an AR-coated piece of thin material, preferably to fully cover end-face 32a of the core Substrate 30 is then adhered to the light pipe core in such a way that the core-substrate interface becomes optically clear, preferably to a high degree. Preferably, the optical clarity of the core-substrate interface is sufficiently high so as to pass above about 96 percent of transmitted light, and more preferably above about 99 percent of transmitted light. A highly clear optical interface between substrate and core end-face results in little or no light loss due to the inclusion of such optical elements in the path of light. With AR coating 38 (or 38 and 40, FIG. 3) on substrate 30, the Fresnel-reflection losses at the end-face of the light pipe are significantly reduced.

2. Adhesive-Material Considerations

The next goal needed to achieve optimum light-throughput gains is to adhere the substrate to the core though an interface that is optically clear and robust.

In more detail, it is desirable for an adhesive material (1) to be relatively flexible when cured so as to resist cracking, (2) to adhere the substrate to the light pipe in an optically clear manner, (3) to be resistant to heat and light, and (4) to be capable of filling in irregularities between the mounting surfaces to help obtain an optically clear bond. Preferably, adhesive material chemically fuses to both the end-face of the light pipe and to the substrate so as to create an optically clear interface between the light pipe and the substrate.

Cyanoacrylate-based adhesive, such as KRAZY GLUE adhesive made by Elmers Products Inc. of Columbus, Ohio, has provided some satisfactory results, but only at the output end of a light that is not subjected to heat from a light source (not shown). Such glue is optically clear and is able to bond the substrate to the light pipe to produce a nearly lossless interface. However the cyano-based glue is inflexible when it dries, so that it can result in cracking and thus a lossy interface. It is also difficult to work with, and does not work well when adhering two surfaces which are not almost perfectly flat. Finally it is not known how much it resists degradation due to exposure to heat and/or light. It has been shown that the cyanoacrylate-based adhesive will degrade after a period of several months, but it has yet to be determined whether the degradation mechanism is the heat load, light load, or a combination of these factors.

A preferred technique is to heat uncross-linked polymer, especially the same polymer as used to form the core of the light pipe, to a point where it flows, and then use it as the adhesive to attach the substrate to the light pipe. This technique is similar to the use of a glue gun with a glue stick, in which glue is heated until it flows and then hardens upon cooling.

Preferably, the uncrosslinked polymer is a thermoset polymer. This avoids a problem of the tendency of non-thermoset, uncrosslinked polymer to flow over time. Preferably, the thermoset, uncrosslinked polymer is obtained as material used in an extrusion process for making light pipe. The polymer so obtained may be from the batch used to make the same light pipe to which the adhesive material is applied. Adhesive material, such as the foregoing, may be combined with the various substrates mentioned above, some of which may be similar in composition to, or the same as, the core material.

The most suitable composition for a polymer adhesive material is one that is most compatible and most similar in composition to the polymer used in the core of the light pipe. For instance, a preferred composition comprises the same type of polymer as the light pipe core polymer. By "type" of polymer is meant the family of polymers, such as acrylic polymers or urethane polymers. Preferably, the adhesive material is made of the same polymeric components as the light pipe core polymer, and preferably in the same proportions as in the core polymer. ("Polymeric components" means herein polymers, copolymers, or both.)

A preferred adhesive material is provided by diverting uncrosslinked polymer used for forming a core. The so-diverted uncrosslinked, thermoset polymer is then applied as adhesive material between the end-face of a light pipe and a substrate coated with an anti-reflective coating The diverted polymer is preferably crosslinkable, and preferably a thermoset polymer, and may comprise one or more components of $C_1$–$C_{18}$ alkyl methacrylates.

A final, uncrosslinked polymer for forming a polymer core of a light pipe can be diverted from various processes used to make light pipes, such as by extrusion or by casting. By a "final, uncrosslinked polymer" is meant material that is fully polymerized and contained the necessary ingredients to form a light pipe core. Preferably, the so-diverted polymer is cooled and stored in a sealed container, under nitrogen, and then re-heated until it is sufficiently fluid to be used as an adhesive. Preferably, the re-heated (or still-warm) polymer is sufficiently fluid so as to fill any voids between substrate and end-face of the light pipe, to achieve an optically clear interface between substrate and light pipe end-face.

If desired, the uncrosslinked polymer of the adhesive material is crosslinked after adhering a substrate to the end-face of a light pipe core. This makes the adhesive polymer resistant to flowing at elevated temperature.

3. Substrate Considerations

To ensure optimum reduction in Fresnel-reflection losses and optimum increase in light throughput in the light pipe, several goals should be met. First, the substrate material that the AR coating is applied to should be optically clear to a high degree. The material should also be capable of handling the light energy that will be transmitted through the light pipe, or elevated temperature especially when the light pipe end-face is near a hot light source (not shown). If the light energy or elevated temperature begins to cloud the substrate, then any gains had by the AR coating could be lost through optical degradation of the substrate.

One preferred material for substrate 30 is MYLAR polyester, which the present inventors have determined can withstand typical thermal- and light throughput loads of a light pipe, while being resistant to cracking. One suitable MYLAR polyester film with an AR coating that has been used is that sold by Southwall Technologies of Palo Alto, Calif. Commercially available AR-coated polycarbonate film can also be used, but has been found to optically degrade faster than MYLAR polyester film due to high heat and light loads.

Other substrates that could be used are optically clear glass or quartz. Since material used to form the core of the light pipe has been proven capable of handing the light energy, such material can be used as a substrate. More generally, the substrate could be made from the same polymer as the light pipe core.

Another suitable substrate comprises a polymer of the same type as that of the light pipe core. This is because the core polymer has been proven to possess the above-noted properties of high optical clarity and resistance to heat and light encountered in normal use of light pipes. Preferably, the substrate is made of the same polymeric components as the light pipe core polymer, and preferably in the same proportions as in the core polymer. Further, the polymer of the substrate is preferably crosslinkable, and preferably comprises a thermoset polymer, and may comprise one or more components of $C_1$–$C_{18}$ alkyl methacrylates.

While the invention has been described with respect to specific embodiments by way of illustration, many modifications and changes will occur to those skilled in the art. It is, therefore, to be understood that the appended claims are intended to cover all such modifications and changes as fall within the true scope and spirit of the invention.

What is claimed is:

1. A solid light pipe arrangement with reduced Fresnel-reflection losses, comprising:
   a) a light pipe with a solid core comprising a polymer;
   b) an optically clear, substrate that passes more than 96 percent of transmitted light; and
   c) a first side of the substrate being adhered to an end-face of the core of the light pipe by adhesive material so as to create an optically clear interface between the substrate and the end-face that passes more than about 96 percent of transmitted lights;
   d) the substrate being adhered to not more than a single light pipe core end-face; and
   e) a second side of the substrate, opposite to the first side of the substrate, contacting an anti-reflective coating.

2. The arrangement of claim 1, wherein the substrate fully covers the end-face of the core.

3. The arrangement of claim 1, wherein the composition of the adhesive material is chosen to create an optically clear interface between the substrate and the end-face that passes more than about 99 percent of transmitted light.

4. The arrangement of claim 1, wherein the adhesive material is a cyanoacrylate-based adhesive.

5. The arrangement of claim 1, wherein the adhesive material comprises a polymer-based plastic.

6. The arrangement of claim 1, wherein the adhesive material is a polymer.

7. The arrangement of claim 6, wherein the adhesive material is an uncrosslinked polymer.

8. The arrangement of claim 7, wherein the polymer of the adhesive material is a thermoset polymer.

9. The arrangement of claim 6, wherein the polymer of the adhesive material is an uncrosslinked, crosslinkable polymer.

10. The arrangement of claim 9, wherein the polymer of the adhesive material is a thermoset polymer.

11. The arrangement of claim 6, wherein the polymer of the adhesive material is a crosslinked polymer.

12. The arrangement of claim 11, wherein the polymer of the adhesive material is a thermoset polymer.

13. The arrangement of claim 7, 8, 9, 10, 11, or 12, wherein the polymer of the adhesive material is the same type as the polymer of the core.

14. The arrangement of claim 7, 8, 9, 10, 11, or 12, wherein the adhesive material is made of the same polymeric components as the polymer of the light pipe core.

15. The arrangement of claim 14, wherein the polymeric components of the adhesive material have the same proportions as in the light pipe core.

16. The arrangement of claim 1, wherein the substrate comprises a polymer.

17. The arrangement of claim 16, wherein the polymer of the substrate is an uncrosslinked polymer.

18. The arrangement of claim 17, wherein the polymer of the substrate is a thermoset polymer.

19. The arrangement of claim 16, wherein the polymer of the substrate is an uncrosslinked, crosslinkable polymer.

20. The arrangement of claim 19, wherein the polymer of the substrate is a thermoset polymer.

21. The arrangement of claim 16, wherein the polymer of the substrate is a crosslinked polymer.

22. The arrangement of claim 21, wherein the polymer of the substrate is a thermoset polymer.

23. The arrangement of claim 17, 18, 19, 20, 21, or 22, wherein the polymer of the substrate is the same type of polymer as the polymer of the light pipe core.

24. The arrangement of claim 17, 18, 19, 20, 21, or 22, wherein the substrate is made of the same polymeric components as the polymer of the light pipe core.

25. The arrangement of claim 24, wherein the polymeric components of the substrate have the same proportions as in the light pipe core.

26. The arrangement of claim 1, wherein both the adhesive material and the substrate both comprise polymeric material.

27. The arrangement of claim 26, wherein the polymeric material of the adhesive material is of the same type as the polymeric material of the substrate.

28. The arrangement of claim 27, wherein the polymeric material of the adhesive material is made of the same polymeric components as the substrate.

29. The arrangement of claim 28, wherein the polymeric material of the substrate is also made of the same polymeric components as the light pipe core.

30. The arrangement of claim 28, wherein the polymeric components of the adhesive material have the same proportions as in the substrate.

31. The arrangement of claim 30, wherein the polymeric components of the adhesive material also have the same proportions as in the light pipe core.

32. The arrangement of claim 1, wherein the substrate is a plastic film or sheet.

33. The arrangement of claim 32, wherein the plastic film or sheet is MYLAR polyester.

34. The arrangement of claim 32, wherein the plastic film or sheet is polycarbonate.

35. The arrangement of claim 1, wherein the substrate is glass or quartz.

* * * * *